No. 828,040. PATENTED AUG. 7, 1906.
L. B. MANDEVILLE.
CREAM DIPPER.
APPLICATION FILED DEC. 4, 1905.
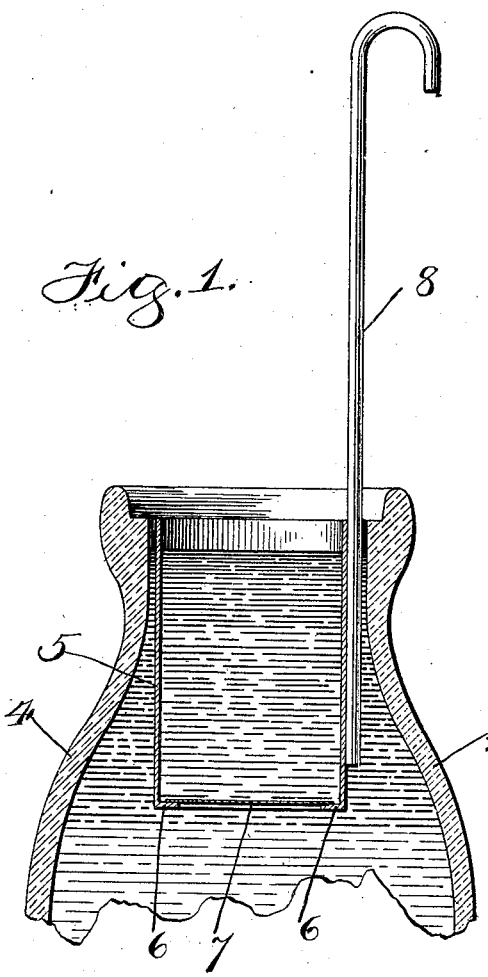
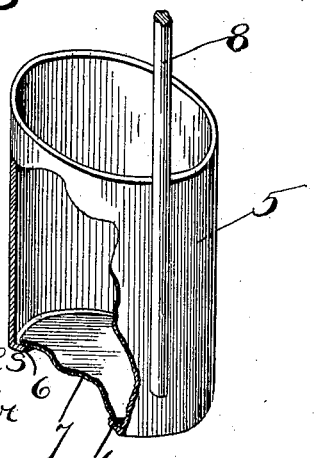
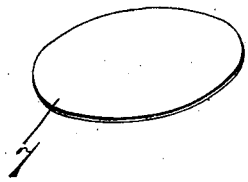
Witnesses
J B Weir
G. V. Domarus.
Inventor:
Louise B. Mandeville,
by Bond Adams Pickard Jackson
her Attys.

UNITED STATES PATENT OFFICE.

LOUISE B. MANDEVILLE, OF CHICAGO, ILLINOIS.

CREAM-DIPPER.

No. 828,040.　　　Specification of Letters Patent.　　　Patented Aug. 7, 1906.

Application filed December 4, 1905. Serial No. 290,189.

*To all whom it may concern:*

Be it known that I, LOUISE B. MANDEVILLE, a citizen of the United States, and a resident of Chicago, in the county of Cook and State of Illinois, have invented certain new and useful Improvements in Cream-Dippers, of which the following is a specification, reference being had to the accompanying drawings.

My invention relates to devices for removing cream from milk, and it has particularly for its object to provide a new and improved dipper for use in removing the cream from milk contained in bottles.

In cities it is now the common practice to deliver milk in bottles, and as the bottles are frequently allowed to stand long enough for the cream to rise in them it is desirable that the cream be removed before the milk is poured out. Owing to the contraction of the bottle-neck, however, it is difficult to get at the cream with a skimmer, spoon, or similar device, and consequently the cream can only be imperfectly removed. Moreover, the inconvenience of removing it from the bottle is such that many persons prefer to pour out the milk and cream and remove the cream after the milk has been allowed to stand long enough for it to rise again, exposing it to the air, and thereby defeating the purpose of bottling the milk.

By my invention I have provided a device which may be effectually and conveniently employed to remove all the cream from the milk while contained in the bottle without agitating the milk. Furthermore, my said cream-removing device, which I term a "cream-dipper," is of such construction that it may be thoroughly cleansed after use, as is of the utmost importance in connection with any utensil used for handling milk or cream.

In the accompanying drawings, which fully illustrate my invention, Figure 1 is a partial vertical section of a milk-bottle, showing my improved cream-dipper in section. Fig. 2 is a perspective view, certain parts being broken away; and Fig. 3 is a perspective view of the valve-disk.

Referring to the drawings, 4 indicates the milk-bottle, and 5 the body or shell of the cream-dipper, which is preferably cylindrical in form, being open at the top and bottom. At the bottom, however, an inwardly-projecting marginal flange 6 is provided, which forms a seat for a valve-disk 7, as shown in Figs. 1 and 2. The valve-disk 7 is a thin piece of metal which is of slightly less diameter than the internal diameter of the body 5 and rests loosely upon the flange 6—that is to say, it is not connected thereto, so that it is free to rise or fall in the body 5 of the dipper. It may also be readily removed when desired. By thus employing a loose disk as a valve the construction of the dipper is greatly simplified and the use of hinged connections is avoided—a feature of great importance in view of the difficulty of properly cleansing a hinge or similar connection.

A handle or rod 8 is provided which is secured to the dipper at one side and projects upwardly therefrom, as shown in Fig. 1, for convenience in using the same.

In practice the dipper is lowered through the cream, the disk 7 being automatically tilted by the operation, so that the cream rises through the bottom of the dipper. Although, as above stated, the disk 7 is at first tilted, the weight of the cream in withdrawing the dipper settles the disk upon its seat, so that when the dipper is lifted the cream in it is retained therein. The cream removed may be discharged from the dipper by simply tilting it. When this is done, the disk 7 does not fall out of the dipper, as might be expected, since by making it only slightly less in diameter than the dipper there is sufficient frictional engagement to prevent the disk from easily falling out, and this is especially true when the parts are coated with cream. The operation above described may be repeated until the cream is entirely removed.

The construction of my improved dipper is such that the cream may be removed without taking up any appreciable quantity of the milk. The dipper should be depressed only far enough to take in the cream; but even if depressed enough to allow milk to enter it the milk has a tendency to drip back when the dipper is lifted, whereas the cream on account of its greater thickness and lower specific gravity is retained.

That which I claim as my invention, and desire to secure by Letters Patent, is—

1. A cream-dipper, comprising a shell having an inwardly-projecting flange at the lower portion thereof, and a detached valve-disk loosely seated upon said flange.

2. A cream-dipper, comprising a shell having an inwardly-projecting flange at the lower portion thereof, a detached valve-disk loosely seated upon said flange, said disk being of slightly less diameter than the shell, and a handle connected with the shell.

LOUISE B. MANDEVILLE.

Witnesses:
PAUL MANDEVILLE,
JOHN L. JACKSON.